(12) United States Patent
McConnell et al.

(10) Patent No.: US 6,608,399 B2
(45) Date of Patent: Aug. 19, 2003

(54) VEHICLE UNIVERSAL DOCKING STATION AND ELECTRONIC FEATURE MODULES

(75) Inventors: John E. McConnell, Ann Arbor, MI (US); Michael N. Maass, Ypsilanti, MI (US); William M. Jarocha, South Lyon, MI (US); Christos T. Kyrtsos, Southfield, MI (US); Pawel W. Sleboda, Bloomfield Hills, MI (US)

(73) Assignee: Lear Corporation, Southfield, MI (US)

(*) Notice: Subject to any disclaimer, the term of this patent is extended or adjusted under 35 U.S.C. 154(b) by 195 days.

(21) Appl. No.: 09/825,229

(22) Filed: Apr. 3, 2001

(65) Prior Publication Data

US 2002/0140289 A1 Oct. 3, 2002

Related U.S. Application Data

(60) Provisional application No. 60/241,172, filed on Oct. 17, 2000.

(51) Int. Cl.[7] .................................................. H02G 3/00
(52) U.S. Cl. .................... 307/10.1; 710/303; 367/683
(58) Field of Search ................................. 361/683–686; 710/300–304; 307/9.1, 10.1

(56) References Cited

U.S. PATENT DOCUMENTS

| 3,756,677 A | * | 9/1973 | Gosswiller .................. 312/108 |
| 4,058,357 A | | 11/1977 | Wallace |
| 5,154,617 A | | 10/1992 | Suman et al. |
| 5,195,183 A | | 3/1993 | Miller et al. |
| 5,339,362 A | | 8/1994 | Harris |
| 5,457,629 A | | 10/1995 | Miller et al. |
| 5,581,130 A | * | 12/1996 | Boucheron .................. 307/10.1 |
| 5,650,929 A | | 7/1997 | Potter et al. |
| 5,978,821 A | * | 11/1999 | Freeny ....................... 361/683 |
| 5,990,573 A | * | 11/1999 | Granitz et al. ............. 307/10.1 |
| 6,086,129 A | * | 7/2000 | Gray .......................... 296/37.8 |
| 6,445,082 B1 | * | 9/2002 | Klauzenberg et al. ..... 307/10.1 |
| 6,469,404 B1 | * | 10/2002 | Pohjola ..................... 307/10.1 |
| 6,472,770 B1 | * | 10/2002 | Pohjola ..................... 307/10.1 |

FOREIGN PATENT DOCUMENTS

DE  WO 98/59425 A  12/1998

* cited by examiner

*Primary Examiner*—Gregory J. Toatley, Jr.
(74) *Attorney, Agent, or Firm*—Brooks & Kushman P.C.

(57) ABSTRACT

A smart, universal vehicle docking station is provided for receiving one or more plug-in feature modules. The docking station includes a personality module arranged to receive the feature modules. The feature modules are of uniform dimensions and include a standardized docking station coupler. Some of the feature modules can be operated separately from the docking station, and are completely interchangeable within the docking station. The personality module is removable so that an entire personality module can be removed from a vehicle for security reasons, as well as to transplanted from one vehicle to another to provide immediate vehicle customization. A gateway located in the docking station allows integration and appropriate signal translation of signals between the modules and a vehicle irrespective of make or model of the vehicle. The present invention allows different features to be easily added or upgraded in a vehicle.

16 Claims, 12 Drawing Sheets

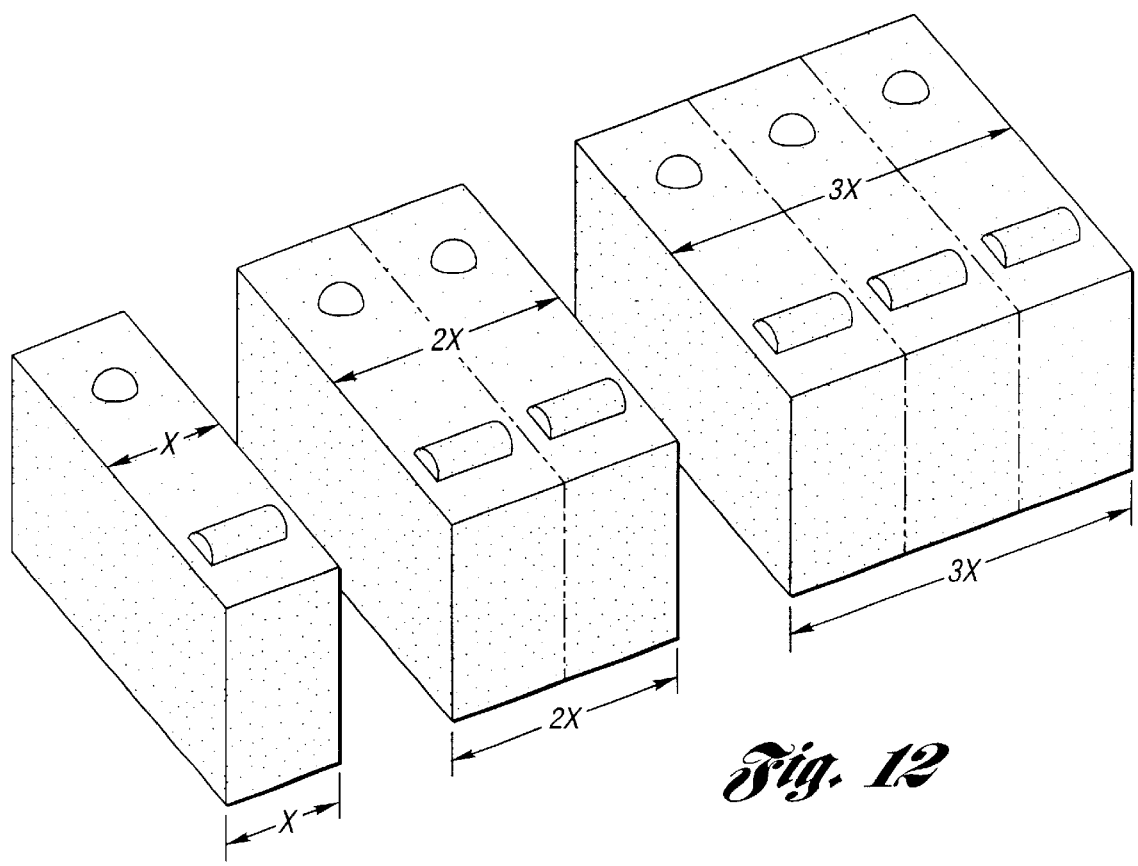
*Fig. 12*
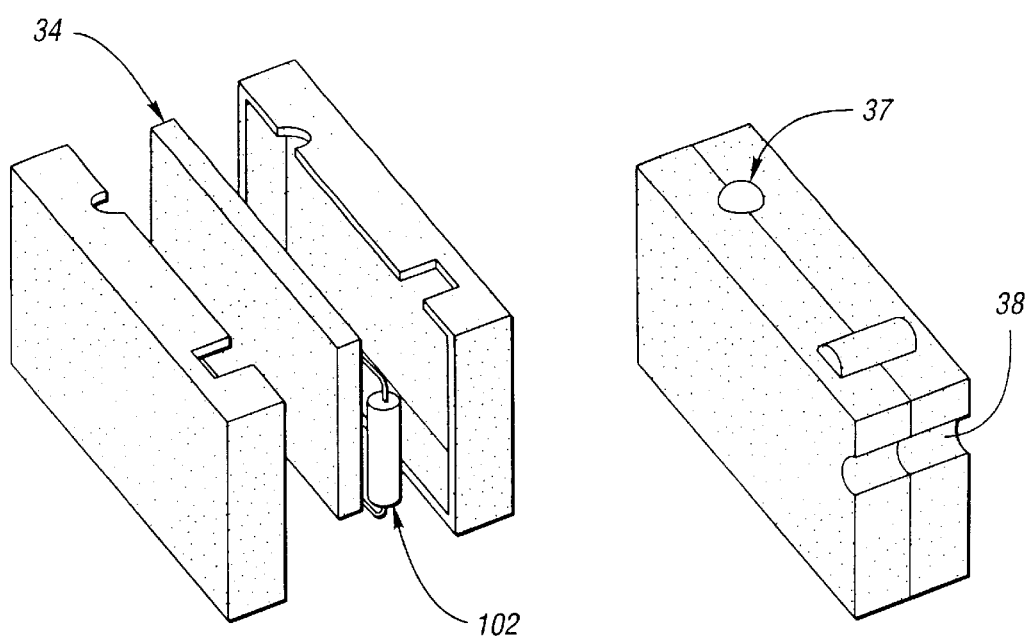
*Fig. 13a*  *Fig. 13b*

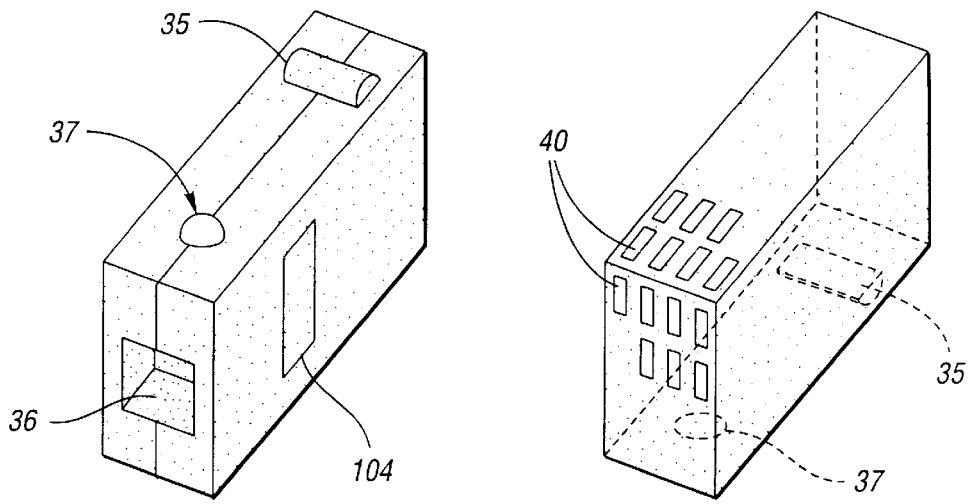
*Fig. 14a*  *Fig. 14b*
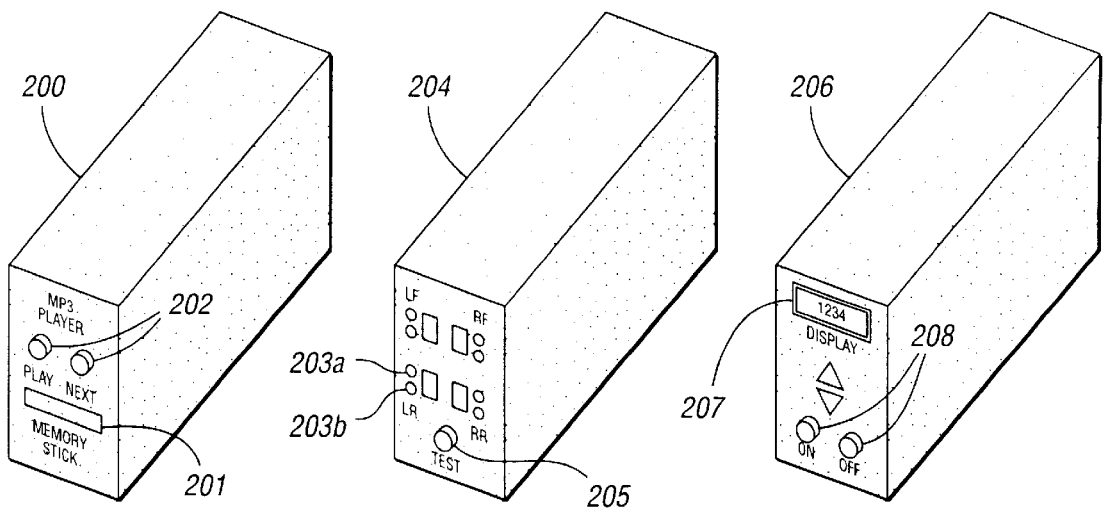
*Fig. 15*  *Fig. 16*  *Fig. 17*

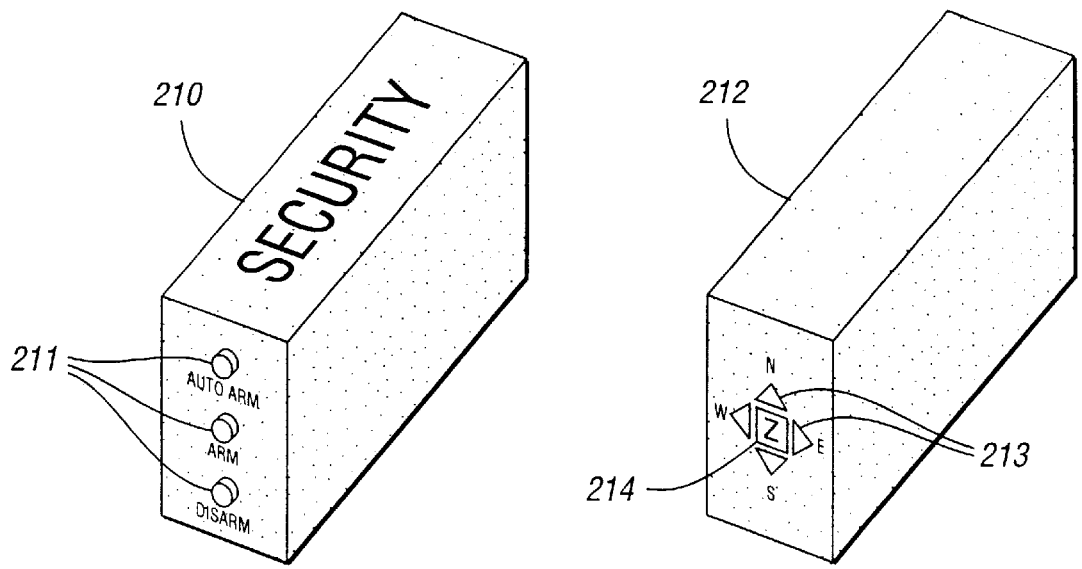
*Fig. 18*  *Fig. 19*
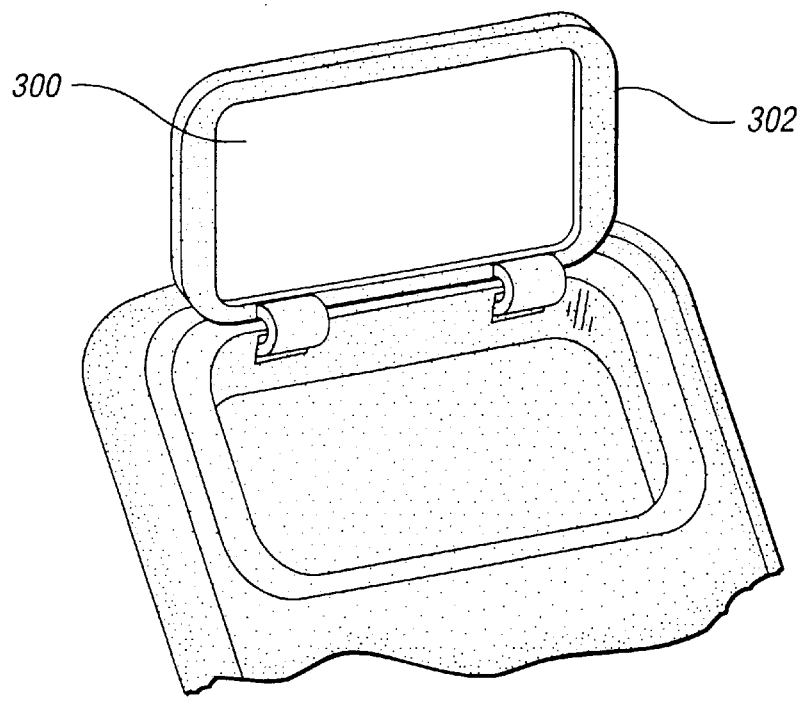
*Fig. 20*

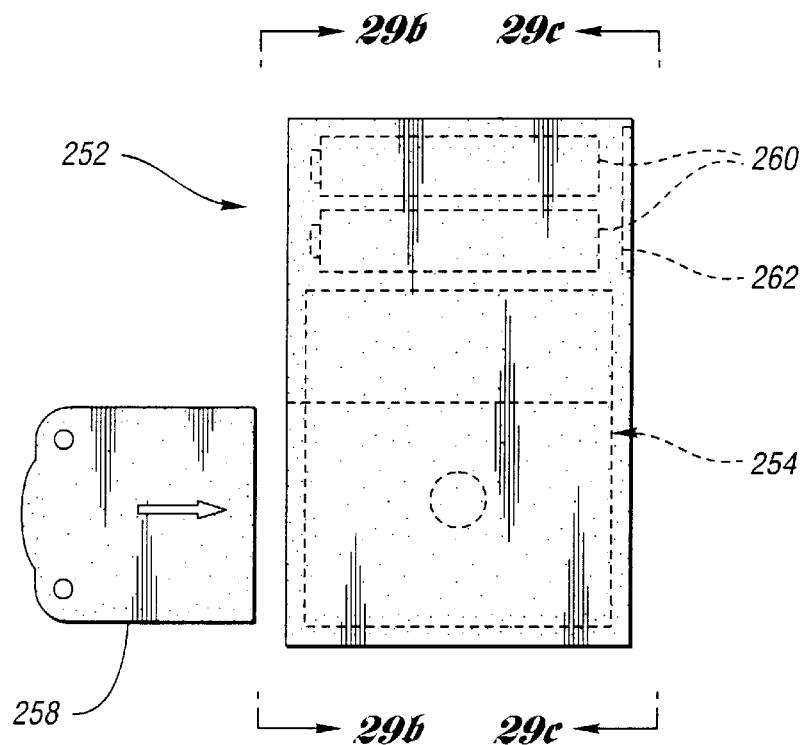
Fig. 29a
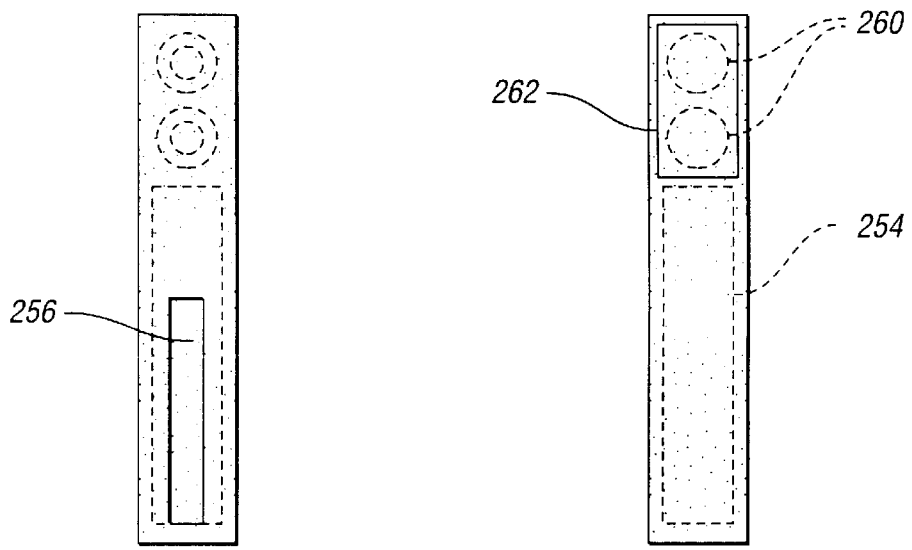
Fig. 29b  Fig. 29c

VEHICLE UNIVERSAL DOCKING STATION AND ELECTRONIC FEATURE MODULES

CROSS-REFERENCE TO RELATED APPLICATIONS

This application claims the benefit of U.S. provisional application Serial No. 60/241,172 filed Oct. 17, 2000.

TECHNICAL FIELD

The present invention relates to arrangements for interfacing one or more electronic subsystems to a vehicle electrical system.

BACKGROUND ART

Generally, a vehicle's electrical system can be modified to incorporate a variety of different electronic subsystem features capable of performing such functions as remote keyless entry (RKE), garage door opener (GDO), and an electrical compass. While such subsystems can be provided as separate devices attached to the interior of a vehicle, interior aesthetics as well as vehicle system performance and synergy are enhanced if these subsystem features are actually integrated with the vehicle's interior and electrical system. Such integration involves interfacing associated subsystem hardware and control processes with the vehicle's electrical control and/or power system. In this manner, a vehicle can be customized by mixing various combinations of such subsystem features onto a base electrical system.

The problem with typical system interface arrangements is that each of the possible subsystem features have hardware and/or control requirements that are unique to the particular function/operation of the subsystem. As such, modification of a base vehicle electrical system becomes specific to each desired combination, and therefore costly to design as well as manufacture. In addition, because the combinations can be changed simply by "adding" or removing a particular subsystem feature, prior interface arrangements do not facilitate easy alteration. Still further, the ability to add new subsystem features or update original system features is limited by the vehicle's original electrical system design and interior configuration.

Thus, a need exists for a vehicle electronic system that facilitates selective implementation of any desired combination of such electronic subsystem features in a cost effective and flexible manner. In addition, a need exists for a system that facilitates easy reconfiguration and/or upgrading of desired subsystem features at any time by a customer, dealer, manufacturer, or aftermarket supplier.

DISCLOSURE OF INVENTION

Therefore, one aspect of the present invention is to provide a vehicle electrical system interface arrangement that addresses each of the above-noted needs, while also advantageously providing a portal for allowing stand-alone type electronic devices to be integrated with a vehicle's electronic system.

In accordance with another aspect of the present invention, a universal interface arrangement is provided that supports complete interchangeability at any time by a customer, dealer, manufacturer, or aftermarket supplier, of one or more uniformly configured electronic feature modules, including electronic feature modules arranged to operate as stand-alone electronic devices, i.e., modules that can be used when not connected to the vehicle electrical system.

In accordance with these and other aspects, the present invention provides a modular vehicle electronic accessory docking system having a stationary interface housing mounted to the vehicle and including an electrical system coupler connected to a vehicle electrical system, at least one removable accessory module including on-board circuitry for performing a designated function, and a removable module rack arranged to mount to the stationary interface housing. The removable rack includes a plurality of uniformly dimensioned mounting spaces arranged to receive one or more of the plurality of removable electrical accessory modules. Each receiving mounting space includes a uniform electrical connector positioned to complete an electrical and/or signal connection between a received accessory module and the electrical system coupler in the stationary interface housing when the module rack is mounted to the stationary interface housing.

In accordance with another aspect of the present invention, a vehicle electronic accessory docking system is provided having a docking station with an interface housing mounted to the vehicle. The docking station includes an electrical system coupler connected to a vehicle electrical system, and a plurality of uniformly dimensioned mounting spaces, each mounting space having a uniformly positioned electrical connector. A plurality of uniformly dimensioned and removable electrical accessory modules are arranged to be interchangeably mounted within any one of the mounting spaces in the docking station. Each module includes on-board circuitry for performing a designated function, wherein the on-board circuitry of at least one of the modules is arranged to allow the module to be operated when not mounted within a mounting space.

In accordance with yet another aspect of the present invention, a removable electronic feature module is provided for use with a vehicle electrical system interface, the interface including a plurality of mounting spaces arranged to receive the electronic feature module, wherein the feature module includes on-board circuitry arranged to perform a particular function, and an electrical contact arrangement arranged to provide electrical coupling with the interface. The electrical contact arrangement is arranged to allow the module to interchangeably mount to any of the mounting spaces in the interface irrespective of the particular function of the on-board circuitry.

The above features and advantages of the present invention are readily apparent from the following detailed description of the invention when taken in connection with the accompanying drawings.

BRIEF DESCRIPTION OF DRAWINGS

FIG. 12 is a perspective view of plug-in feature modules configured to have a standard dimension, or integer multiple thereof;

FIGS. 13(a) and (b) are perspective views of an exploded plug-in feature module and the assembled unit respectively;

FIGS. 14(a) and (b) are perspective views of the top and bottom edges respectively of a vertically mounted plug-in module;

FIG. 15 is a perspective view of a stand alone MP3 player plug-in feature module in accordance with the present invention;

FIG. 16 is a perspective view of a stand alone tire pressure plug-in feature module in accordance with the present invention;

FIG. 17 is a perspective view of a stand alone satellite radio plug-in feature module in accordance with the present invention;

FIG. 18 is a perspective view of a vehicle security plug-in feature module in accordance with the present invention;

FIG. 19 is a perspective view of a electronic map plug-in feature module in accordance with the present invention;

FIG. 20 is a perspective view of a display unit integrated into a hinged cover element attached to the docking station in accordance with one embodiment of the present invention;

FIGS. 29(a)–(c) are front and side views of a DataPlay™ player plug-in feature module in accordance with the present invention.

BEST MODE FOR CARRYING OUT THE INVENTION

The present invention provides an interfacing arrangement that allows different features to be easily added or upgraded in a vehicle at the time of manufacture, as well as at any time during the life of the vehicle.

Figure 1:
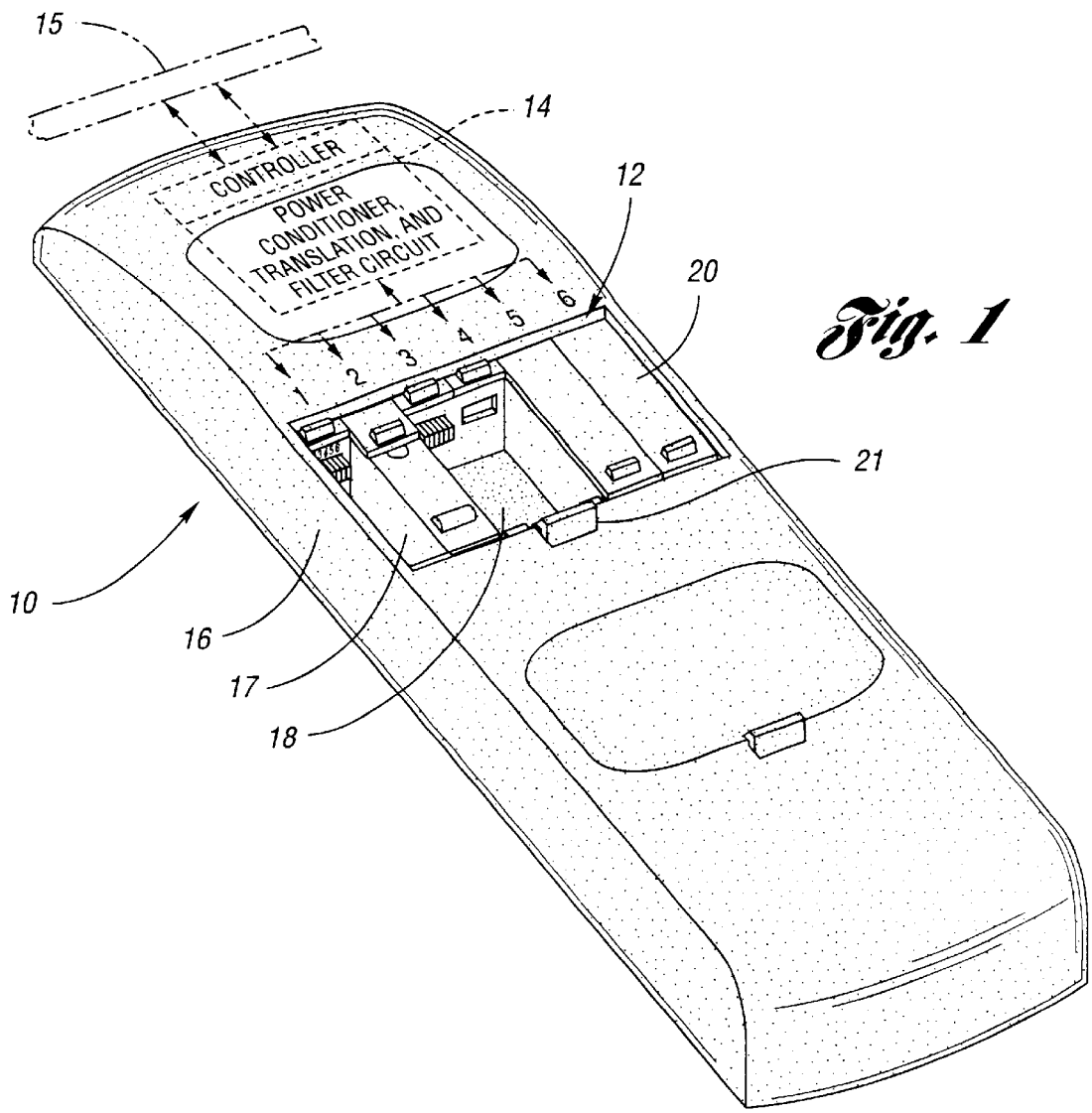
FIG. 1 is a perspective view of a smart universal docking station in accordance with the present invention.

Referring to FIG. 1, a smart, universal docking station 10 is shown in accordance with an exemplary embodiment of the present invention. Docking station 10 interfaces with a removable and portable rack 12, i.e., a "personality module," containing at least one of a plurality of removable feature modules 12 described in more detail below. A controller 14 includes suitable circuitry and/or programming to perform power conditioning and protection, filtering, and data protocol translation. Controller circuit 14 operates as a gateway for supply of electrical power (conditioned) and communication of data between the vehicle's electrical and signal distribution system 15, such a multiplexed data wire or power line, and particular feature modules coupled to rack 12.

Figure 2:
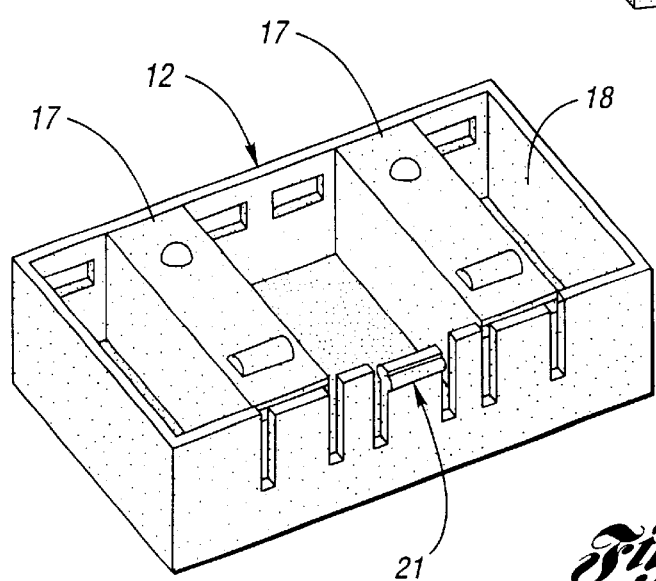
FIG. 2 is a perspective view of a removable personality module in accordance with the present invention.

Rack 12 is shown in isolation in FIG. 2, and is designed to allow removal and/or replacing of the rack from docking station 10. Such an arrangement allows an entire personality module to be removed from a vehicle for security reasons, as well as to be easily moved from one location in a vehicle to another, or from one vehicle to another, to provide immediate customization of a particular vehicle's available features. In addition, the rack could be used remotely from a vehicle such as by coupling with a non-vehicle interface or application. The rack can be secured in place within docking station 10 by spring lever or other suitable security mechanism. This arrangement facilitates removal of an entire rack having one or more feature modules mounted therein in one quick and simple action.

Figure 3:
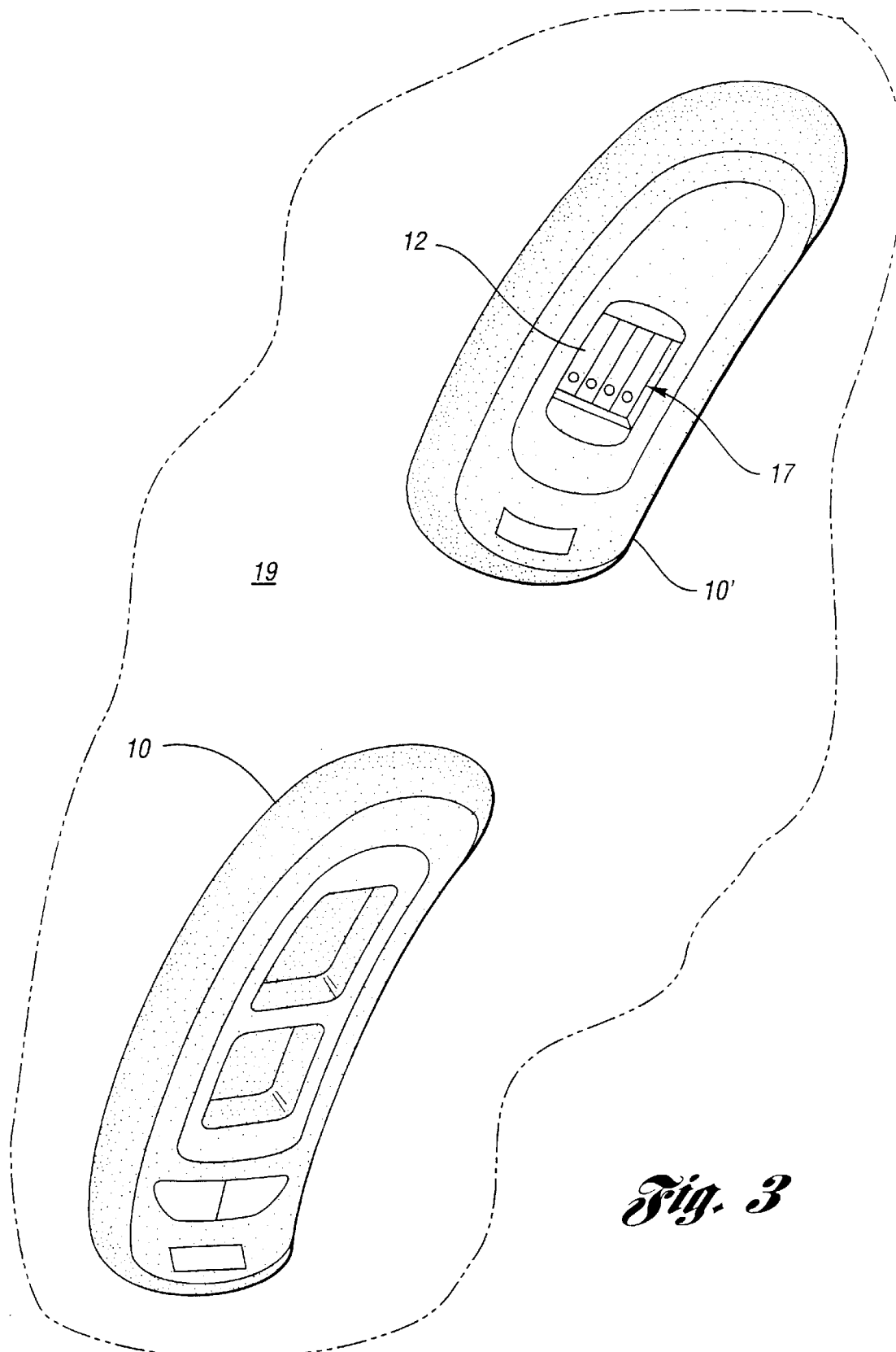
FIG. 3 is a view of a vehicle interior showing mounting of the universal docking station as an overhead console.

The docking station includes a stationary, base interface housing 16 mounted within the vehicle interior or trunk compartment. One or more base housings can be located in multiple sites throughout the vehicle, such as but not limited to an overhead console, a glove box, a central console, a floor console, arm rests, the back of a head rest or rear arm rest, or inside a trunk. FIG. 3 provides an illustration of multiple base housings where one is mounted in an overhead console, while another is mounted in the roof of the vehicle so as to be accessible from a rear seat.

For feature modules having an on-board electrical or communication capability, the module becomes electrically connected to the vehicle when the rack is inserted into the base housing and snapped into position. If the rack is already mated to a base housing, individual feature modules are connected to the vehicle electrical system upon insertion and snapping into place within a selected mounting space or spaces 18 in rack 12. As described in more detail below, base housing 16 can include a spring loaded or sliding door arranged to enclose the rack. In addition, individual sliding covers 20 can be provided on either the rack or base housing to allow covering of empty or unused module mounting spaces. An electronic or mechanical security locking mechanism 21 can be incorporated into the docking station to deter theft.

In accordance with one aspect of the present invention, the smart universal docking station includes a contact/coupler arrangement that is universal to each mounting space 18. In other words, a universal electrical bus system is provided allowing any module to be inserted into any one of the mounting spaces. The uniformity of the coupler and bus system within docking station 10 enhances design flexibility and standardization of module housings and couplers.

Figure 4:
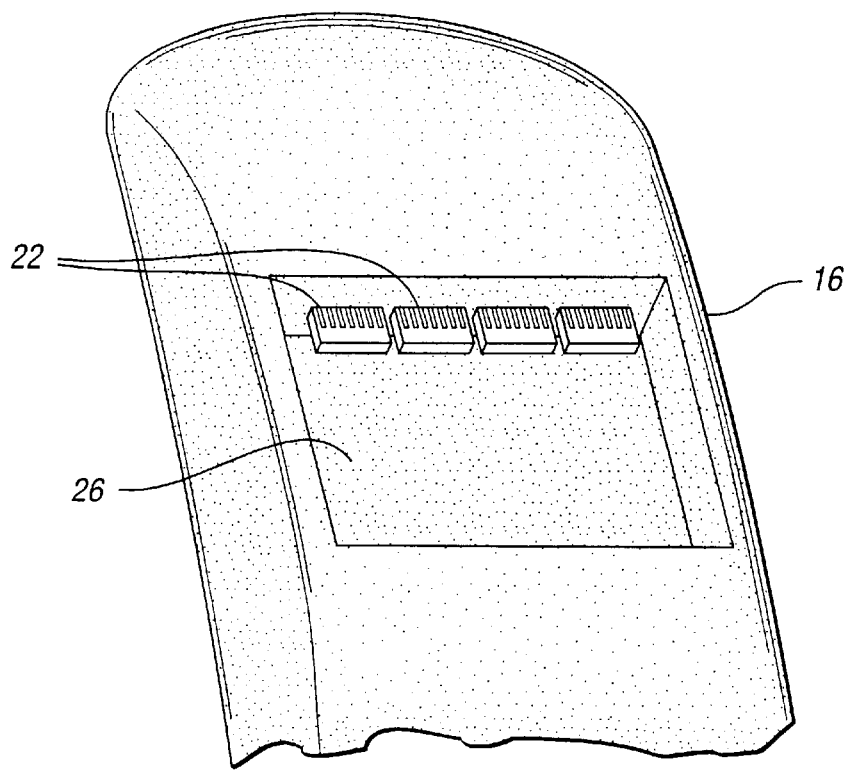
FIG. 4 is a perspective view of module connector arrangement in accordance with one embodiment of the present invention.
Figure 5:
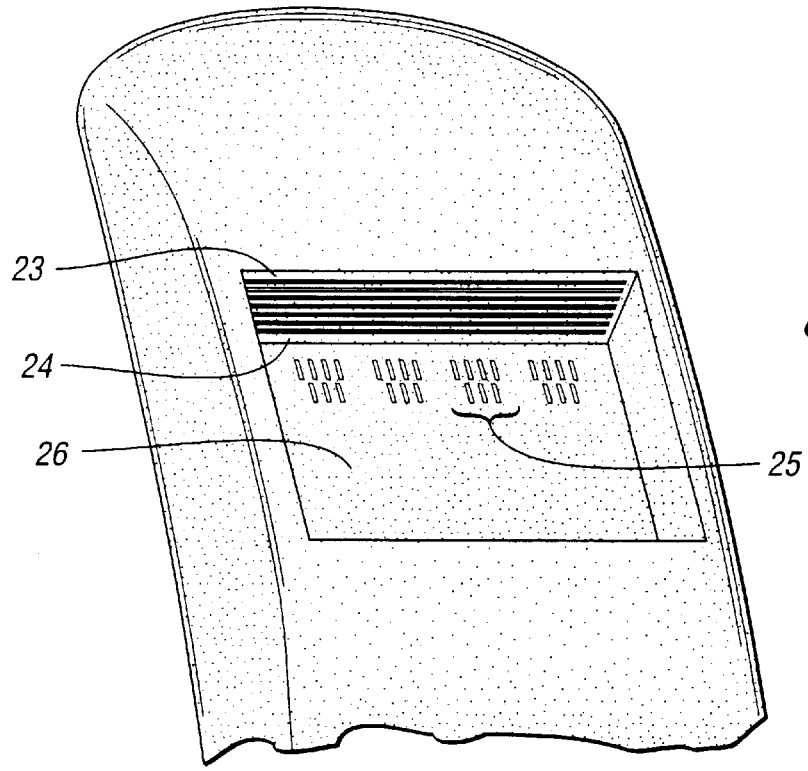
FIG. 5 is a perspective view of module connector arrangement in accordance with another embodiment of the present invention.

More specifically, FIGS. 4 and 5 show different exemplary embodiments for the universal power and signal distribution arrangement for a smart universal docking station in accordance with this aspect of the present invention. Because smart universal docking station 10 is designed to accept standardized size modules 17 capable of performing a wide variety of functions and features, the power and signal distribution system is arranged to provide a comprehensive set of power and signal carrying conductors to properly couple with any given module inserted anywhere in the rack. In one embodiment, each mounting space includes a universal connector having a conductor for:

1. Power;
2. Switchable Power;
3. Ground;
4. Serial Bus 1;
5. Serial Bus 2; and
6. Audio out (2 wires).

The embodiment of FIG. 4 shows individual contact pads 22 having the conductors formed thereon. When a module is inserted into a mounting space 18, a corresponding contact pad formed on the module housing is positioned such that engagement and contact is made between the pads. It is noted that not all conductors may be needed for a particular module to function. Thus, while each contact pad will be universally the same for all modules, the contact pad and/or electronics of each module are tailored to electrically couple only with those power and signal conductors needed for the module's operation.

FIG. 5 illustrates another embodiment having a strip conductor 23 continuously extending across all mounting spaces 18 along an inner recess surface of the rack. To facilitate expansion and system design flexibility, a space 24 can be provided for placement of future conductors. Alternatively, metal contacts 25 can be located on bottom surface 26 in the recess of rack 12.

Figure 6:
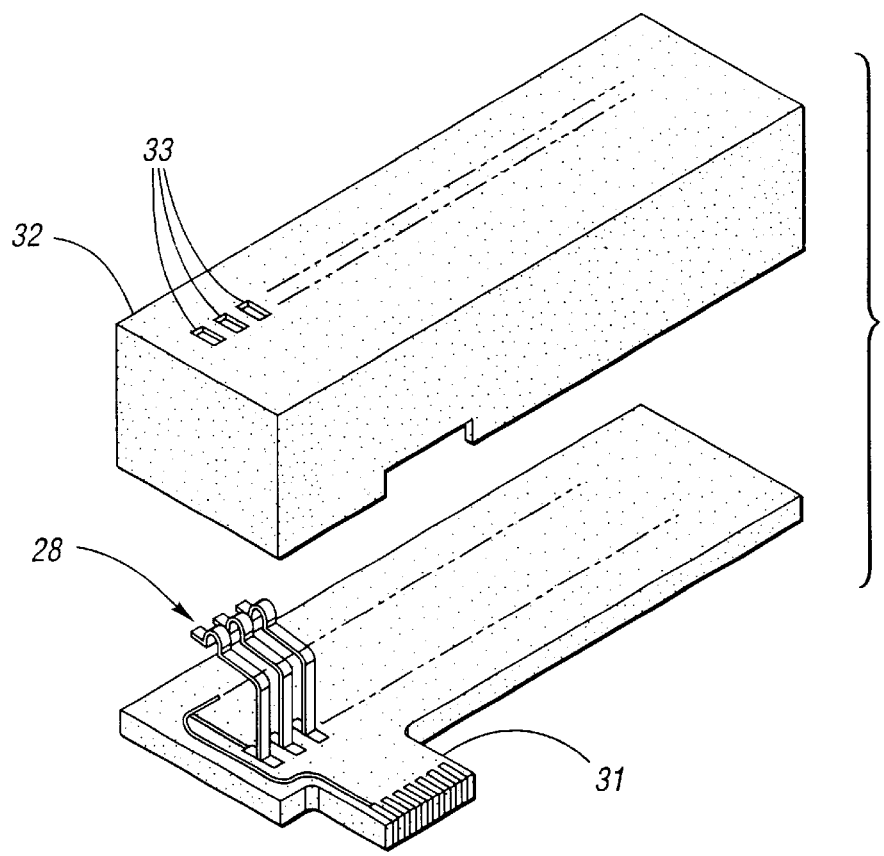
FIG. 6 is an exploded perspective view of an exemplary embodiment for a docking station signal/power connector arrangement to provide signaling and power to a coupled feature module.
Figure 7:
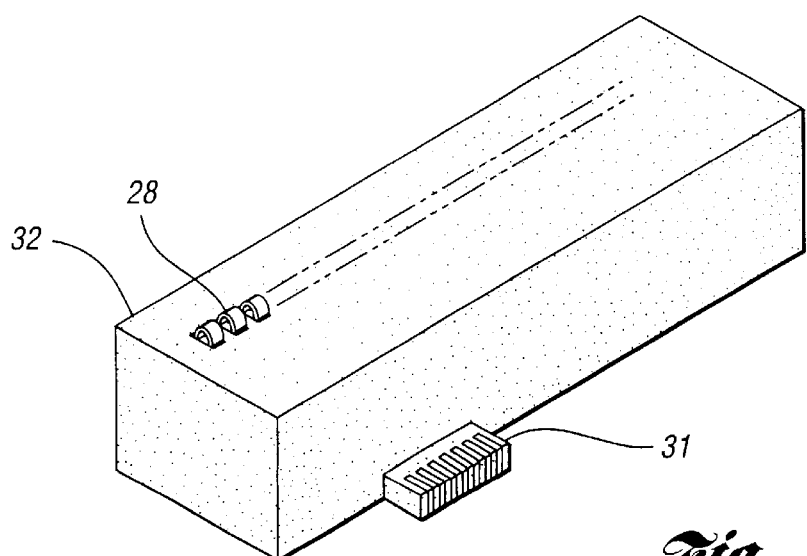
FIG. 7 is a perspective view of the signal/power connector of FIG. 6 showing assembly of the cover.

Another embodiment of a power and signal coupling arrangement is shown in FIGS. 6 and 7. More specifically, each mounting space includes a set of spring contacts 28 of sufficient length to make contact with the conductor pads on the feature modules as the modules are inserted and seated into the docking station. The spring contacts are mounted to a printed circuit board (PCB) 30. PCB 30 can be formed to include an integrated appendix 31 to function as a male connector for receiving a female connector of a wire harness. An optional cover 32 can be used to enclose PCB 30. The cover includes suitable openings 33 to allow a portion of the spring contacts to extend therefrom. An opening can also be provided in cover 32 for connector 31.

Because PCB 30 can be coupled to a wiring harness, the embodiment of FIGS. 6 and 7 allows different modules to be inserted into consoles and or instrument cluster housings not originally designed to receive a rack 12 in accordance with the present invention. This arrangement allows a vehicle be easily upgraded to accept the rack and/or any of the feature modules of the present invention throughout the life a vehicle equipped with a smart universal docking station.

The module provides flexibility for assembly and provides repairability if the contacts should be damaged. The pins can be of a plurality of designs providing a spring action of a given stiffness to attain suitable contact pressure when contacting the feature module contact pads. Attachment to the smart universal docking station can be by plastic snaps, screws, or other securing devices.

Figure 8:
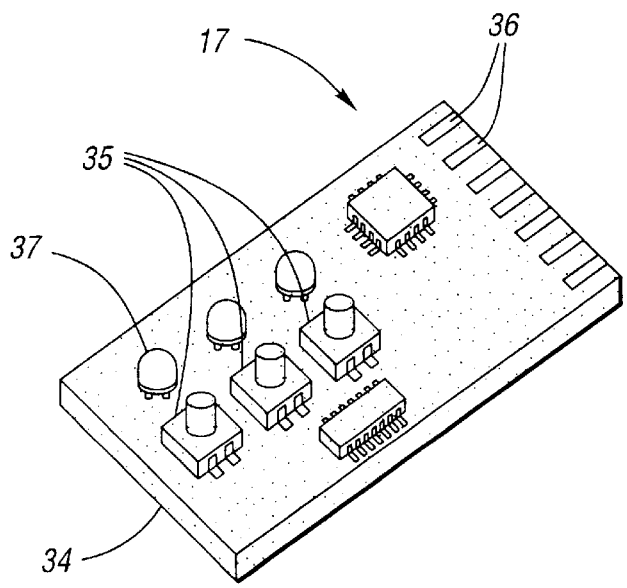
FIG. 8 is a perspective view of a plug-in feature module circuit board oriented for horizontal mounting in the docking station.
Figure 9:
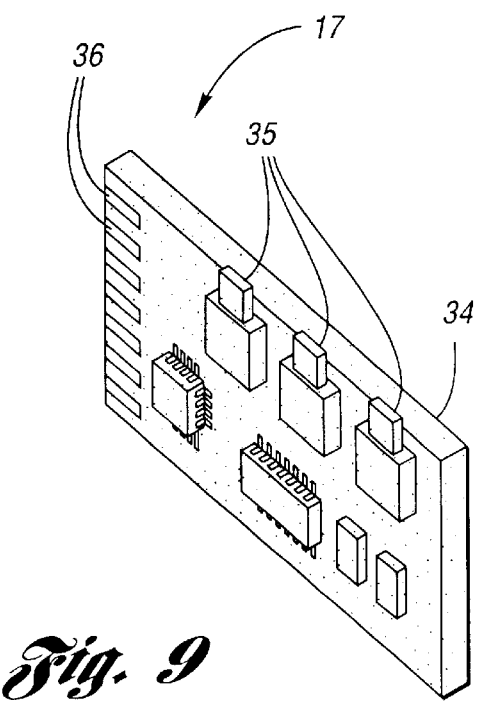
FIG. 9 is a perspective view of a plug-in feature module circuit board oriented for vertical mounting in the docking station.
Figure 10:
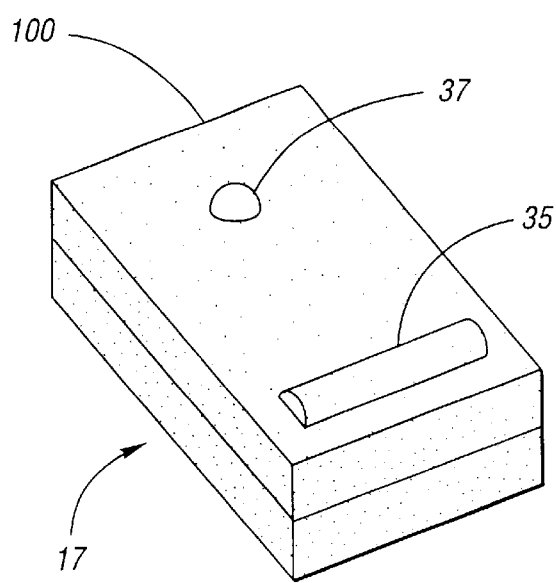
FIG. 10 is a perspective view of a plug-in feature module with housing oriented for horizontal mounting.
Figure 11:
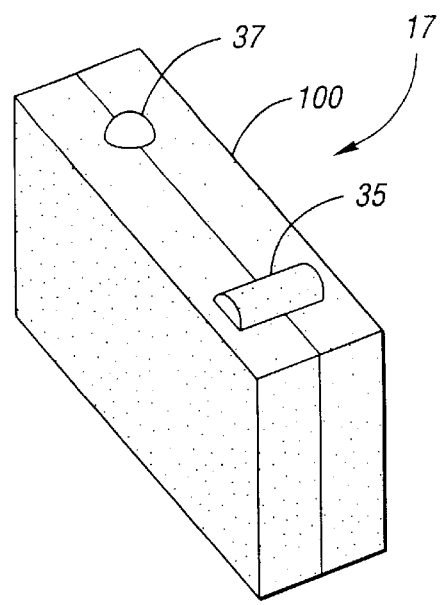
FIG. 11 is a perspective view of a plug-in feature module with housing oriented for vertical mounting.

In accordance with the present invention, the feature modules are the electronic modules that perform various types of functions such as controlling opening and closing of garage doors as well as a number of other functions described in more detail below. FIGS. 8 and 9 show exemplary embodiments of the internals of a feature module 17. More specifically, each module includes a circuit board module 34 that can be mounted into the smart universal docking station in either a horizontal (FIG. 8) or vertical (FIG. 9) plane. The modules preferably include outer protective enclosures that are uniformly dimensioned to fit within one or more rack mounting spaces 18 irrespective of the particular module function. Bare circuits (i.e., circuit boards without protective enclosures) could be used in some situations. Materials for the circuit boards include but are not limited to epoxy-glass resin such as FR4, G-10, Ceramic, Flex Circuits using Kapton or polymide, or Rigid Flex.

If a particular module requires user actuated switches, one or more switches 35 can be mounted to the board and make electrical connections to the circuit. As shown, the push button switches can be either top activated or side activated. The top activated push button switches are particularly suited when the module is mounted in the horizontal plane, while the side activated buttons are articularly suited for use when the modules are mounted in the vertical plane. As described below, the functions of each module will be dependent upon the desired features of the module. In general, each feature module integrates known circuitry for carrying out each particular function into a circuit board that can be encapsulated into a module closure or housing. In accordance with the present invention, the circuit boards are all designed with common physical dimensions ensuring total interchangeability within the rack. In addition, it is preferred that all switches for a particular module are mounted/located in common positions relative to x and y dimensions across the rack.

Referring to FIGS. 10–14, a feature module closure or housing arrangement is shown in more detail. More specifically, a housing 100 contains and protects the circuit board and electronics that provide the specific function of the module. Each feature module housing is constructed to a standard outside physical dimension, or even multiple thereof, to ensure complete interchangeability between all feature modules within the rack.

The electrical contacts are integral components of the housing. When the feature module is inserted into the rack and snapped into position, the module contacts 36 will make electrical contact with smart universal docking station 10. As noted above, push button switches 35 and indicators such as LEDs 37 are preferably mounted in standard positions to ensure position uniformity from module to module.

As best seen in FIG. 13b, one embodiment of the feature module housing can include a locking slot 38 arranged to cooperate with a snap arrangement located on the rack to hold the modules in place or position within the rack. However, this is not to be construed as limiting. As shown in FIG. 12, a feature module width can be increased in even increments of a standard module width, such as but not limited to 1×, 2× or 3× a standard width module. By maintaining multiples of a standard width, variations in module size can be accommodated while still supporting complete interchangeability of a module within the rack. Larger size modules facilitate placement of multiple circuit boards inside the module housing, thereby allowing modules having more complex functions and features. Larger sizes also provide flexibility in accommodating user interaction and overall ergonomics.

As shown in FIG. 13a, a feature module housing can be arranged to accommodate a rechargeable battery or other suitable energy source 102. Such an arrangement allows the present invention to include use of one or more portable, stand alone feature modules, i.e., a module that can be used both independently from the docking station 10, as well as in conjunction with the docking station and the vehicle communication and electrical power system. Such standalone modules could be arranged to operate in conjunction with a docking station located in a user's dwelling.

As noted above, the feature modules are arranged to be mounted in either the horizontally or vertically. The mounting plain is determined by the layout of the docking station. The vertical plane may support greater density of modules per rack. As shown in FIG. 14a, an access door 104 may be included to allow access to dip switches (not shown) and other adjustable components associated with a particular feature module. As shown in FIG. 14b, a set of contact pads 40 can be arranged on the module housing so as to make electrical connection with contact pads 25 in base housing 16. The contact pads 40 are positioned on one or more facings of the module housing depending on the position of contact pads 25.

Description of the various feature modules of the present invention will now be made in connection with FIGS. 15–29. It is noted that unless specifically described, the on-board circuitry for each of the modules is conventional or developed separately from the present invention. In accordance with the present invention, the on-board circuitry is reconfigured for packaging in a uniform module housing and connection arrangement as described above. In addition, as discussed in more detail below, many of the feature modules are advantageously arranged to operate in a stand-alone mode separate from the rack or vehicle electrical system.

Referring first to FIG. 15, the present invention provides a standard interface to allow a plug-in/standalone digital audio player feature module 200, such as an MP3 type player, to be connected to consumer and/or automotive electronics inside the vehicle. The connection via rack 12 supports processing of an output signal from the digital audio module for distribution by a vehicle's entertainment system, as well as provides a human interface and electrical power to the module.

In one embodiment, the digital audio player module is arranged to receive a mass data storage media device, such as a memory stick or other suitable storage media type arrangement, that stores the desired digital audio files. The storage media device is separately connected to a PC to download the music. The storage media device is arranged to be plugged into the player module. Once the digital audio player module is connected to the rack and powered up, the player module can be operated to output the stored audio to the vehicle speaker system via the vehicle interface.

Referring now to FIG. 16, another possible feature module includes a tire pressure monitor 202 adapted for connection to the vehicle control system via rack 12 and docking station 10. The tire pressure monitor module includes circuitry arranged to monitor the tire pressure in each tire via sensor signals received from the vehicle communication system, and alert the driver of a low air pressure condition. The monitor module can also communicate with a vehicle mounted system arranged to automatically inflate a tire in a low pressure condition. In the embodiment shown, LED's or other type of visual and/or audible indicators are used to indicate safe or low pressure conditions. A test button can be provided with suitable circuitry and/or programming to facilitate manual testing of the monitoring and warning system.

Referring now to FIG. 17, another possible feature module includes a satellite programming receiver module 204. The satellite receiver module includes suitable receiver circuitry for processing programing signals broadcast by a satellite and received by an appropriately positioned antenna. The satellite receiver module is arranged to produce an audio output signal for playback through the vehicle's speaker system. In addition, the module can be arranged to generate a video output signal for display on a display mounted on the module housing, a vehicle mounted display, a display integrated into the docking station housing, or a separate display module mounted in the rack (the latter two described in connection with FIGS. 20 21 respectively). Control buttons are provided on the module housing for control of functions such as on-off, volume, and tuning.

Referring now to FIG. 18, another possible feature module includes a vehicle security system module 206 arranged to provide signals indicating location of the vehicle, and/or to allow remote disabling of the vehicle. The module includes transmitter and receiver circuitry arranged in accordance with known principles to transmit a beacon signal when triggered and/or generate a control signal which can disable a vehicle's fuel supply or engine ignition to prevent further operation of the vehicle. The beacon signal can be tracked by an appropriate signal locating receiver. The module can be triggered by an output signal from a vehicle mounted alarm system, an alarm system incorporated into the security module or provided in a separate alarm feature module, or by receipt of remotely transmitted activation signal. The security module thus facilitates tracking and recovery of a stolen vehicle.

Referring now to FIG. 19, another possible feature module includes an electronic map module 208 having circuitry arranged to provide a display of a given geographic area. In other words, the module can be programmed to display specific geographic regions, such as a particular state or city, at varying levels of detail. This module can provide an electronic alternative to conventional paper maps. Navigation through the map is accomplished in accordance with known principles by actuating one or more navigation buttons locate on the module housing. The module can include its own display, or communicate with a vehicle mounted display, a display integrated into the docking station housing, or a separate display module mounted in the rack (the latter two described in connection with FIGS. 20 21 respectively). As shown, the navigation buttons can be implemented in the form of arrow keys arranged to control scrolling the graphical representation of the displayed map in a direction corresponding to the direction of the arrow. A zoom (Z) function can be provided to enlarge or reduce the scale of the map displayed on the screen of the display.

Referring now to FIG. 20, an information/video display arrangement 300 can be incorporated into the docking station housing 10 such as by positioning on the back side of a feature module compartment lid. The display can be driven from vehicle mounted systems using a common communication protocol, or by a docked feature module. As shown, the lid can be closed, thus removing the display from sight. The lid can be arranged to be moved by manual operation or via a motorized drive arrangement.

Figure 21:
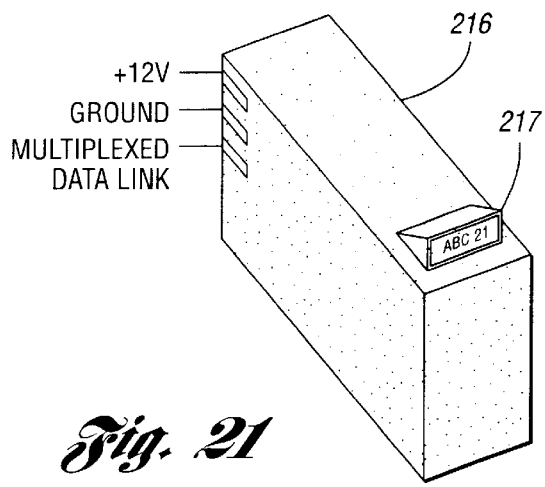
FIG. 21 is a perspective view of an electronic display plug-in feature module in accordance with the present invention.

In addition, as shown in FIG. 21, a display feature module 210 can be provided to display information and/or video signals on a pivotable or fixed position display unit mounted to the module housing. Module 210 can also be arranged to operate as an interface and video driver circuit for connection and communication with a remotely mounted display device (not shown).

Figure 22:
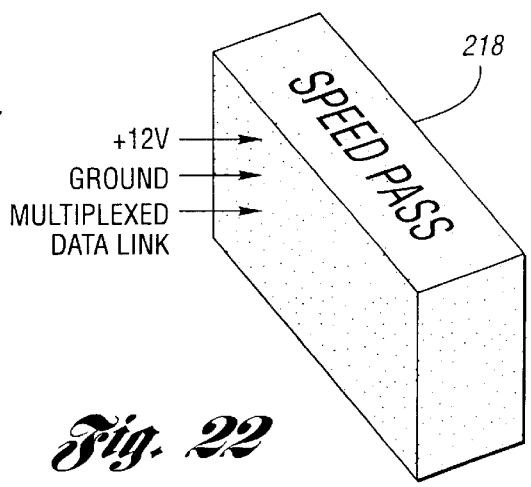
FIG. 22 is a perspective view of a stand gas station "speed pass" type plug-in feature module in accordance with the present invention.

Another possible feature module shown in FIG. 22 includes a gas station speed pass module 212 that docks into the universal docking station rack. The gas station speed pass is programmed to wirelessly transmit information to a receiver located at a gas pump or cashier station indicative of authorization to purchase a predetermined quantity of gasoline. For example, the speed pass module can include a memory arrangement for storing data indicative of a predetermined amount of gasoline. This information can be selectively transmitted at the time of purchase. The module can include a receiver circuit for receiving a return signal indicating the amount actually purchased so that the data in the memory can be updated accordingly. Once the authorized amount is reached, the module an be removed from the rack, and reprogrammed for a new amount. In addition, the gas station speed pass module can be arranged to operate as an electronic debit card with access to an account number to debit an account after the purchase of gas or goods. As noted above, communication between the gas station speed pass module and the servicing unit preferably utilizes wireless technology.

In addition, the speed pass module, or a separate but similarly configured module, could be arranged to operate as a "smart" toll module. The smart toll module is programmed to operate as a pre-paid identifier so that motorists traveling on a toll road do not have to stop the vehicle to pay a toll to a toll booth attendant or automated toll machine. Instead, the module could be operated to transmit an ID signal and account information as the vehicle passes by a designated receiving area. A receiver/processing system receives the module's ID signal, and the associated account is automatically debited to pay for the toll charge.

Other possible applications of this module include automatic debiting of an account to pay for food items at a drive-thru window, wireless debiting of an account to permit entry into parking areas, amusement parks, and recreational parks, and communicating identification information as part of an authorization arrangement for controlling entry into restricted and/or secured parking facilities. In accordance with the present invention, use of such a module would eliminate the need for conventional identification or authorization stickers or badges typically displayed on vehicles. This allows personal information to be maintained in private.

Lastly, this module could be arranged to operate as an electronic license plate. More specifically, the module could be programmed/reprogrammed with such licensing and ownership information by an appropriate state authority at the time a person obtains or renews a vehicle license. The module can be programmed to transmit the vehicle license and other registration/ownership information when remotely interrogated by authorized officials, such as law enforcement officers. For example, a patrol car equipped with a suitable receiver or interrogation transponder unit would be able to wirelessly access the information stored in the module memory as the vehicle is moving along a road. There would be no need to for visual inspection of a license plate mounted to the vehicle to obtain such identification information.

Figure 23:
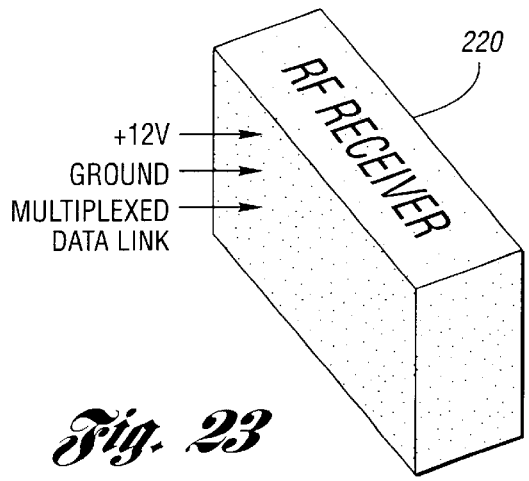
FIG. 23 is a perspective view of a remote keyless entry (RKE) plug-in feature module in accordance with the present invention.

Another possible feature module shown in FIG. 23 includes an RF receiver module design 214, such as suitable for use as an RKE system. Other types of control arrangements can be provided, such as remote engine starting, or remote vehicle disabling, can be implemented using the RF receiver module. The RF receiver module includes circuitry arranged to receive and decode signals from an RF transmitter unit, and send associated control signals to the vehicle such as a lock/unlock signal to the vehicle door locking control system. Because module 214 is removable from the docking station, the present invention allows the RF receiver module to be removed for added security. For example, if used as an RKE system, a conventional key would be required to unlock a vehicle door if the RF receiver module is removed from the vehicle. The ability to remove the RF receiver module also allows the module to be transferred to compatibly equipped vehicles. Such an arrangement would allow the same RF transmitter control unit to be shared by different vehicles.

In addition, while not to be construed as limiting, the RF receiver module is preferably used in conjunction with a docking station located in an overhead console. Mounting of the RF receiver module in an overhead console location will substantially increase the effective range of the RF transmitter or allow a more efficient circuit design for increased battery life of the RF transmitter unit.

Figure 24:
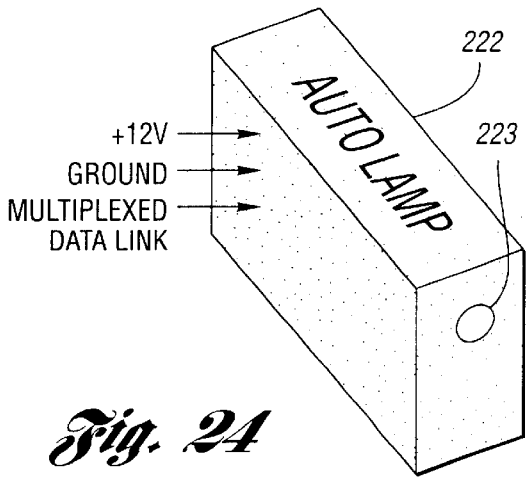
FIG. 24 is a perspective view of an automatic light dimmer/control plug-in feature module in accordance with the present invention.

Another possible feature module is an automatic vehicle lighting or "auto lamp" control module 216 as shown in FIG. 24. More specifically, module 216 includes circuitry arranged to automatically control the function of a vehicle's headlights or interior lights based on the amount of outside light. An ambient light detector is formed in the module housing along with a control arrangement to allow the lights to be automatically dimmed or turned on and off as a function of the detected level of ambient light.

Figure 25:
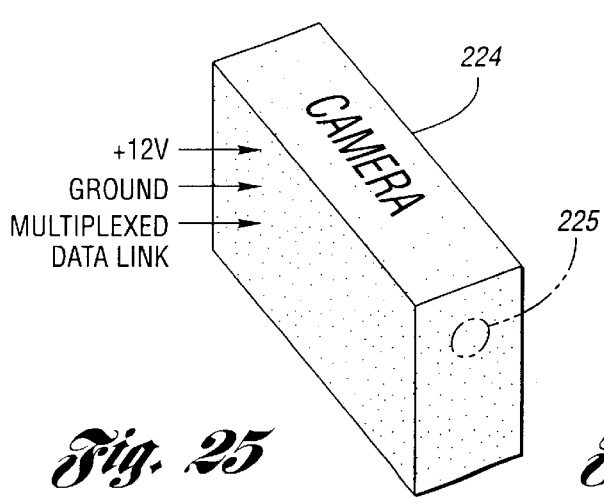
FIG. 25 is a perspective view of an electronic video camera processing plug-in feature module in accordance with the present invention.

Another possible feature module shown in FIG. 25 includes a camera module 218. As shown, the module can include video processing circuitry as well as a video camera unit integrated therein. The video camera unit includes a lens 219 protruding from the module housing. Alternatively, the video camera unit can be remotely mounted and interfaced with the processing circuitry located in the module. In addition, more than one camera unit could be interfaced with the module. For example, a first camera can be positioned on the vehicle to produce a forward direction view, and another camera positioned to produce a rear direction view. The camera module can be arranged to generate a video output for display on a vehicle mounted display, or a display integrated into the docking station housing or a separate display module connected to the rack as described above in connection with FIGS. 20 and 21.

Figure 26:
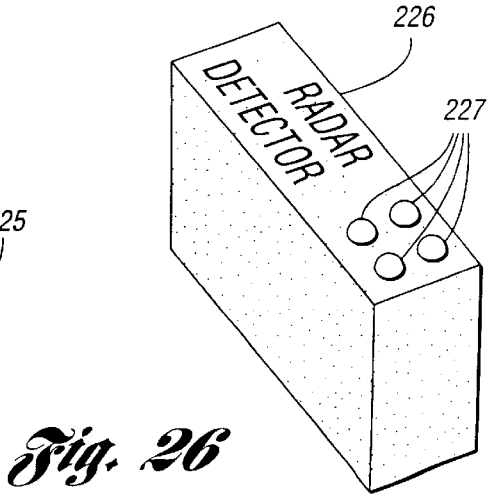
FIG. 26 is a perspective view of a radar detector plug-in feature module in accordance with the present invention.
Figure 27:
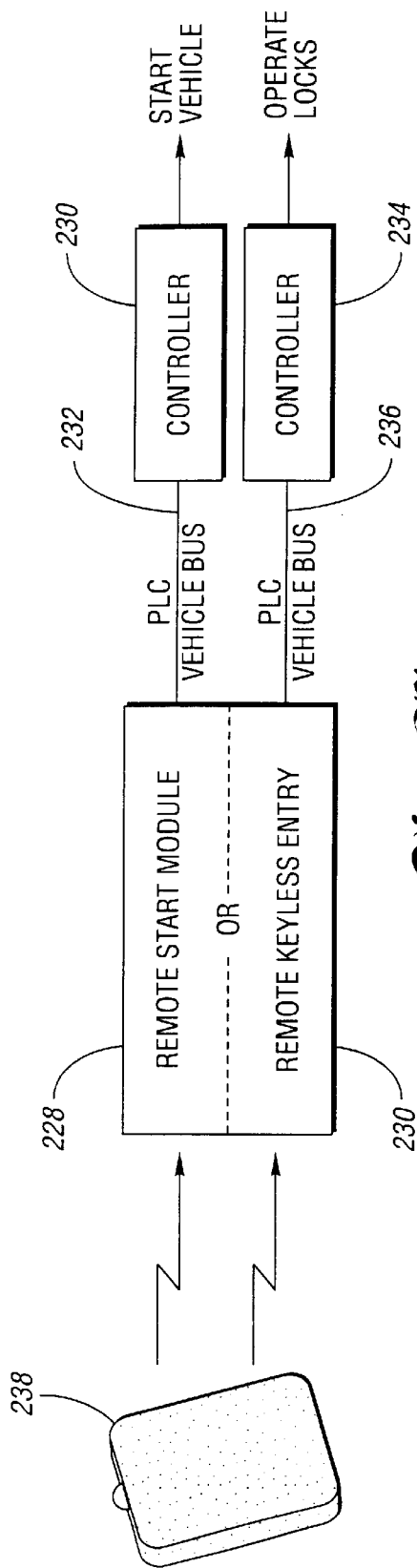
FIG. 27 is a block diagram of a remote engine starting and RKE plug-in feature module arrangement.

Another possible feature module shown in FIG. 26 includes a radar detector module 220. The radar detector module would include suitable detection circuitry to produce an audible and/or visual warning to the driver. As shown for illustrative purposes, one or more LEDs 221 are provided on the module housing for producing such an alert.

The radar detector module allows advantageously allows for optimum location (when docked in an overhead console docking station) of the radar detector circuitry, as well as elimination of separate power chords typically required by conventional radar detector units. In addition, since separate mounting hardware is eliminated, portability is significantly enhanced. Finally, the radar detector module can be advantageously concealed inside a docking station having a closeable lid or compartment door to deter theft or detection.

Another possible feature module provides a remote power line controller for either in-vehicle applications, or to activate specific devices in a home when docked in station 10. An exemplary embodiment is also shown in connection with FIG. 28 described below.

For in-vehicle applications, because the docking station provides access to both power and communication lines in the vehicle, a link can be created for modules that communicate data over the communication lines and any other device that uses vehicle power. For example, the information generated by a module arranged to measure distance to objects in front of a vehicle could be made available for use by any other device in the vehicle simply by using the power line carrier. Another application involves pooling collected sensor data. For example, a sensor could be placed anywhere in the vehicle, and arranged to communicate the collected data using the vehicle's electrical system/power line carrier technology. The link module can then receive the data over the power lines, and retransmit the data to specific controllers over the data communication bus.

Thus, as described above, the docking station and uniform feature module arrangement of the present invention advantageously provides a convenient and practical location to install modules such as a remote engine start module 222 and RKE module 214 as an aftermarket design. An exemplary embodiment is represented in the block diagram of FIG. 27.

More specifically, in accordance with the present invention, the desired module is merely "plugged" into the personality rack to provide an immediate ability to either remotely start the vehicle engine or operate the door locking system. The remote engine start module would require the vehicle to include an interface/controller arrangement 224 capable of starting the vehicle engine in response to receipt of a "start" command by the remote start module. The remote start module includes circuitry for communicating with the controller over would using a power line carrier or the vehicle data bus 226.

Similarly, the RKE module includes circuitry arranged to communicate either directly with the vehicle locks, or via an interface/controller 228 provided on the vehicle or in a different feature module to communicate control signals based on command signals received by the RKE module. The interface could use a power line interface, or provide control signals over a data bus 230 or directly to a lock actuator. Both modules or responsive to signals transmitted by an appropriate remote transmitter unit 232.

Figure 28:
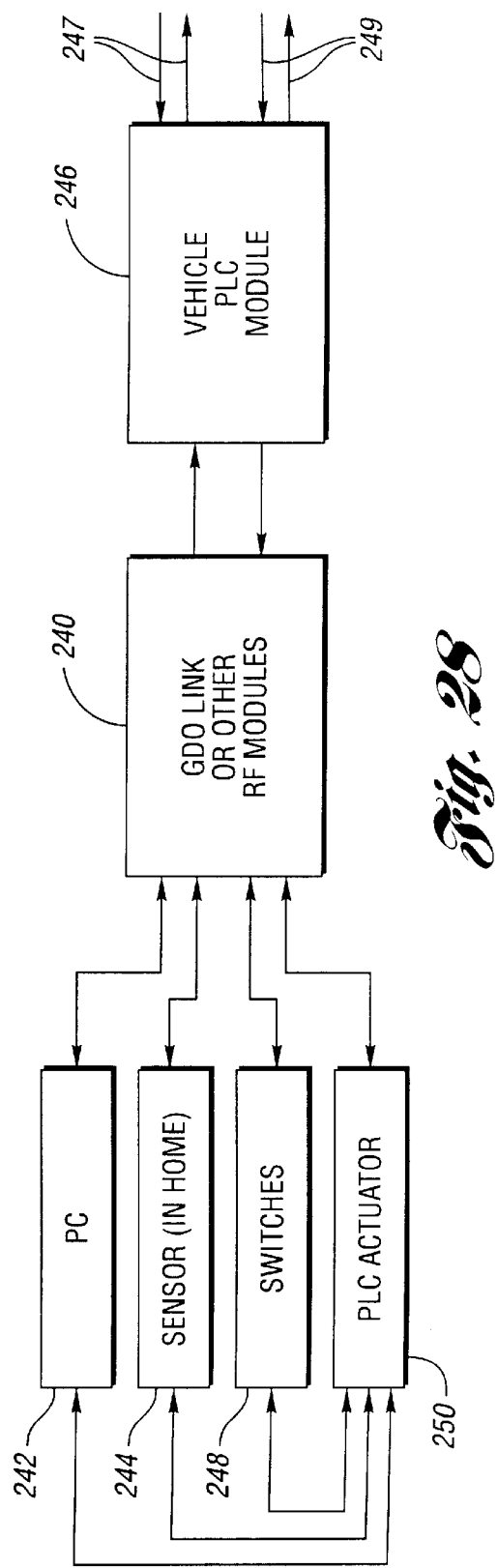
FIG. 28 is a block diagram of a GDO/home security control arrangement in accordance with the present invention.

Another possible feature module arrangement shown in FIG. 28 includes a garage door opener (GDO) module 234. In accordance with the present invention, the GDO module can include any available door opener transmitter/coding arrangement located on-board the module. In one embodiment, a power source such as a replaceable or rechargeable battery is located inside the module housing. In another embodiment, the module is arranged to receive electrical power from the vehicle. The latter embodiment requires the GDO module to be docked in the docking station before the module can be operated to transmit a control signal.

FIG. 28 also shows use of the GDO or other RF module with a power line carrier (PLC) vehicle communication line architecture. As shown, a vehicle PLC module 246 provides an interface to the power line wiring of the vehicle for a module mounted in the docking station. A first set of connections 247 allow posting of signals to and from a vehicle system command port, and a second set of connectors 249 allow posting of signals to and from the vehicle power line. A home PC 242 can communicate with module 240, as well as in-home sensors 244, other control switches 248, and one or more PLC actuators 250. Communication with module 240 can be achieved wirelessly while the module is docked in the vehicle docking station, or through a remote interface when module 240 has been removed form the vehicle.

In yet another embodiment, the GDO module circuitry could be arranged to operate passively. In this embodiment, the passive GDO module circuit is arranged to transmit a programmed control code upon receipt of a query signal transmitted by a stationary transmitter/beacon unit typically located in the garage. Since the query signal has a limited range, the passive GDO module will only be triggered to automatically transmit the control signal when the module is within range of the transmitter/beacon unit. In other words, the transmitter/beacon unit is arranged to periodically transmit the query signal. If a passive GDO module having a tag with the proper ID data is located within the range of the transmitter/beacon unit, the module will respond by transmitting a signal to acknowledge its presence. The garage door opener then activates and opens or closes the door. A switch can also be provided on the passive GDO module housing to allow a user to selectively enable the module. The passive GDO module can include an internal power source, or derive electrical power solely from the vehicle when docked in the docking station. It will also be appreciated that the GDO and passive GDO modules can be arranged to communicate wirelessly with a control or security system located in a dwelling.

The circuitry of the GDO module can be formed by generally reconfiguring the circuitry of an existing GDO transmitter. That is, the GDO module will operate in the same way as available GDO units except that the outside dimensions and buttons are configured to conform to the uniform dimensions of a feature module to allow mounting in the docking station rack. When provided with its own power supply, the GDO module can operate as a stand-alone device, i.e., generate the coded signals to control operation of a garage door or home security system without requiring that the module be mounted in the docking station.

A further possible feature module shown in FIGS. 29(*a*)-(*c*) is a DataPlay™ digital media player module 222 having a media reader and processing circuit located within the housing. DataPlay™ digital media is a known arrangement used to store digital data files such digital music, games, and digital pictures. The player module housing includes a slot for allowing insertion of a DataPlay™ disc into the reader. The player module can include an integrated power source, such as one or more removeable or rechargeable batteries, to allow the module to be operated separate from the docking station. The module housing can include a removeable battery access panel to allow access to the batteries. The DataPlay™ player module is arranged to generate a video and/or audio output that can be reproduced on a vehicle entertainment system via the docking station interface.

A further possible feature module includes a GPS module configured to communicate wirelessly with a satellite-based navigational system to allow a user to determine the geographic location (latitude, longitude, and altitude) the module. This geographic information can be displayed and/or used by a vehicle or module-based navigation or tracking system to determine current vehicle location, as well as a route taken by the vehicle. For example, the GPS module can include suitable programming to determine and/or check/verify distance traveled by the vehicle. In addition, dynamic vehicle position information output by the module can be processed and tracked by a controller arranged to detect irregular vehicle movement such as typically caused by a drunk or drowsy driver. Suitable corrective and/or alarm action can taken by the controller.

In addition, a beacon or transmitter could be placed on the vehicle to allow the geographical information to be sent to a base station if the vehicle is stolen. The beacon could be remotely activated as is understood in the art. Still further, the information could also be used by people that rent the vehicle to keep track of their personal belongings. Also, since one or more modules can operate in combination through the docking station interface, the GPS module can be used in combination with an immobilizer module described below.

Another possible feature module includes a navigation module arranged to allow an operator to determine potential travel routes, as well as select an "ideal" path for any situation. In accordance with the present invention, the navigation module includes an integrated power source to allow the module to be operate as a stand-alone device. In other words, the navigation module can be removed from the vehicle and used either in another vehicle, a bicycle, or on an excursion on foot away from the vehicle. In addition, the navigation module could be uploaded, such as at a base interface device located in a home or office, or using blue tooth or similar technology, with data indicative of a designated path and directions for reaching a desired destination. The module could also operate across the docking station interface with a GPS module to track and save particular vehicle routes. Lastly, the navigation module could be used in conjunction with a system arranged to automatically operate vehicle direction and speed, dependent on road locations and other possible traffic or road conditions. The module can include circuitry capable of generating a video and/or audio output signal.

Yet another possible feature module includes a rear collision avoidance module. More specifically, the rear collision avoidance module includes processing circuit capable of predicting potential collision with objects in the path of a vehicle traveling in reverse based on input sensor signals. The mounting of a rear collision voidance module in an overhead docking station in accordance with the present invention provides an optimized location for such a system, as well as provides for interface with other control system and feature modules across the docking station interface, depending on the particular modules mounted in the docking station. For example, the rear collision avoidance module can interface with a vehicle controller that is able to accurately determine road characteristics. Such an arrangement facilitates enhanced computation of stopping distances. This module can also interface with a GPS module or a navigation module across the docking station interface to allow the module to predict oncoming road characteristics, such as oncoming steep or curved road surface. Other interfaces may include traffic accident reports or road work, vehicle braking characteristics, etc.

Another possible feature module includes a "Blue Tooth" linking module. More specifically, Blue Tooth is an industry standard wireless communication link arranged to allow a module unit to send information to a "home base" or remote unit that is within a distance of a 100 foot from the module unit. Such an arrangement allows a vehicle to be upgraded to blue tooth capability at any time.

As noted above, another feature module includes an immobilizer module. The immobilizer module is arranged as a security module having circuitry arranged to generate a control signal that electronically disables an ignition switch on the vehicle. In accordance with the present invention, the immobilizer module can include on-board circuitry and processing capability to support use of a security pass arrangement, such as security codes, password, or fingerprint, as a way of securing operation of a vehicle. The security pass arrangement can also be arranged to restrict the ability to remove the immobilizer module from the docking station. For example, if the module is disconnected/removed from the docking station without input of an appropriate password, removal of the immobilizer module can automatically trigger a control signal that will disable the vehicle ignition. This operation also allows a user to voluntarily disable the ignition until the user returns to the vehicle. Alternatively, a passive radio frequency identification tag (RFID) tag circuit could be employed within the module to disable the vehicle unless the user enables the module with a separate RF transmitter, such as an RKE transmitter.

Still another possible feature module includes a snooze detector module arranged to track and process data indicative of irregular operation of the vehicle to determine if a driver is falling asleep while driving the vehicle. Without being limiting, such data can be generated by sensors arranged to detect weaving patterns, sudden acceleration or deceleration, drifting patterns, and measures indicative of the driver's physical condition, such as detecting prolonged closure of eyelids, and changes in body temperature and blood pressure. The module can generate an output to trigger an audible, visual, and/or tactile warning system as a corrective response.

Still another possible feature module includes an alcohol detector module having a breathalyzer circuit arranged to process a driver's breath, and generate an output signal that enables or disables the vehicle ignition. The breathalyzer hardware can be provided as an input device that connects to the breathalyzer module. To start a vehicle, the user would be required to breath into an input orifice to allow the module processing circuit to determine the level of alcohol in the operator's body. If the level exceeds a predetermined value, the module generates a control signal across the docking station interface to disable the vehicle's ignition. Because the breathalyzer module of the present invention is easily added to an existing docking station, the present invention provides an arrangement capable of restricting operation of a vehicle by convicted drunk driving offenders.

This module can also including a data recording arrangement able to determine if the module is being by-passed by providing a record of the number period of time a vehicle has been operated without a proper breathalyzer input. In order to reduce the likelihood of cheating, the module can be responsive to external sensors to allow the vehicle to start only when the person is detected as being seated in the driver's seat. If a weight change on the seat is detected, further operation or running of the vehicle can be stopped.

Another possible feature module includes a travel minder module. This module includes a processor and memory arrangement arranged to provide a stand-alone, multi-purpose device capable of saving travel directions from Internet-based search engines or other applications, as well as oral instructions for reaching specific destinations. In addition, the travel minder module can be arranged to interface with a GPS system or module across the docking station to record information indicative of the path of travel for the vehicle.

Still further, this module could be arranged to generate an output, such as for display on a screen, identifying hotels, restaurants, or other locations of interest for a given area. In yet another possible embodiment, the travel minder module can include circuitry arranged to operate in conjunction with a mobile telephone device to provide a communication interface for reserving hotel or restaurant accommodations.

Still another feature module includes a vehicle security/intrusion module having circuitry arranged to respond to external sensors for detecting a brake-in of the vehicle. For example, the module can be arranged to detect via communication through the docking station interface that the doors have been opened or the vehicle started in violation of a predetermined starting sequence such as receipt of a special key sequence or code. Alternatively, the module can be arranged to detect entry into or detection of an attempt to start the vehicle without the presence of a properly coded passive RFID unit. Still another embodiment can provide a fingerprint verification arrangement where the user touches a predetermined sensor arrangement located on the module housing, and on-board processing circuit determines whether the detected fingerprint corresponds to an authorized user.

Figure 30:
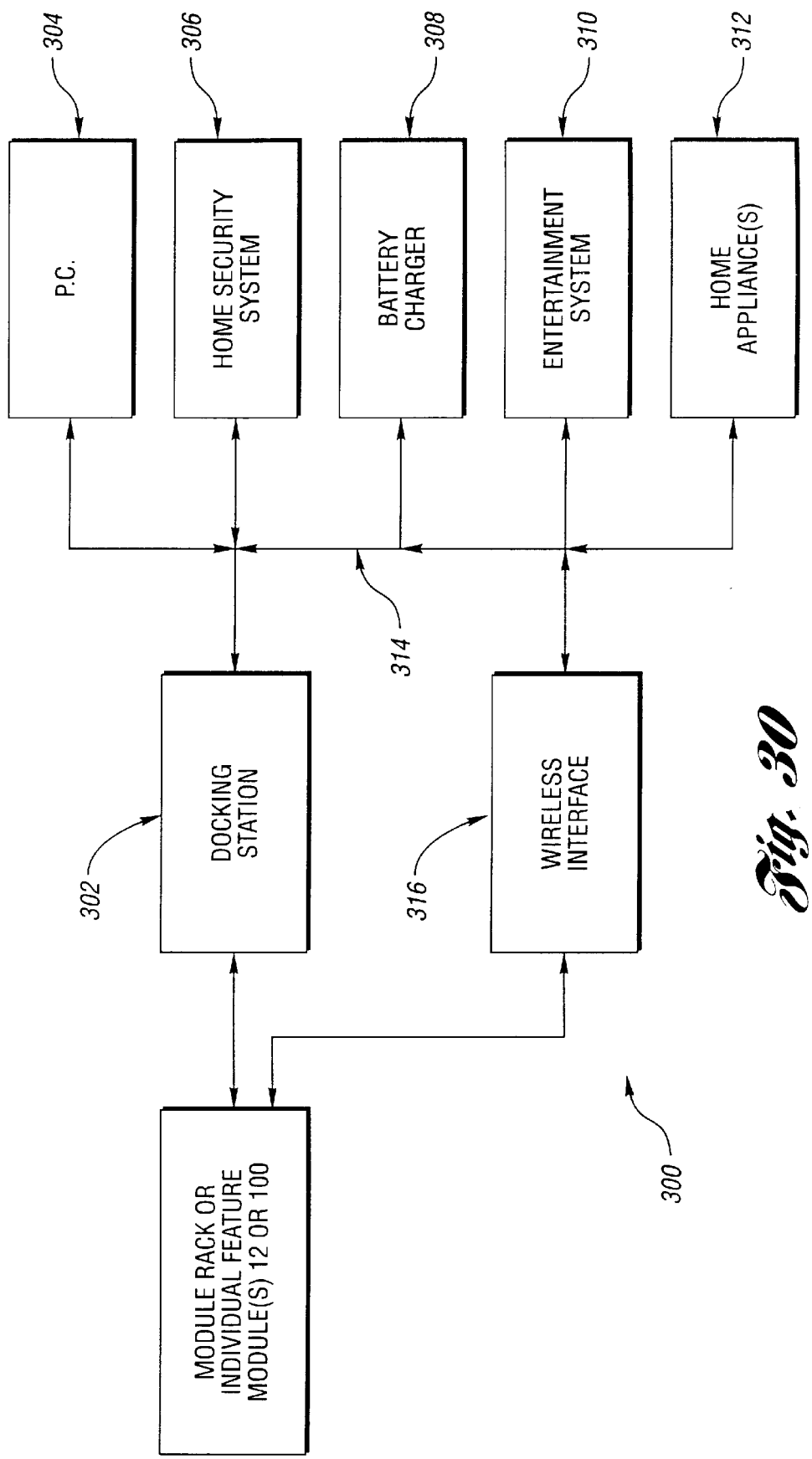
FIG. 30 is a block diagram of an non-vehicle interface arrangement in accordance with the present invention

Referring now to FIG. 30, individual feature modules and/or the entire rack could also be used in conjunction with a non-vehicle interface arrangement 300. More specifically, a docking station 302, such as similarly arranged to docking station 10, can be coupled to one or more non-vehicle devices, such as a computer system 304, home security system 306, battery charger device 308, a home audio/video entertainment system 310, or various home appliances 312, via a communication bus 314. A wireless interface 316 having suitable antenna and receiving circuitry, such as a blue tooth arrangement, can also be used to interface modules with one or more of the non-vehicle devices. Docking station 302 can be arranged to receive one or more individual feature modules, or a populated rack 12. Docking station 302 and/or wireless interface 316 can be connected to individually to one or more of the non-vehicle devices, or in a daisy chain arrangement with multiple devices.

Therefore, while embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular electronic accessory docking system for a vehicle comprising:
    a stationary interface housing mounted to the vehicle, said stationary housing having an electrical system coupler connected to a vehicle electrical system;
    a plurality of removable electrical accessory modules each including on-board circuitry for performing a designated function;
    a removable module rack arranged to mount to the stationary interface housing, said removable rack comprising a plurality of uniformly dimensioned mounting spaces arranged to receive one or more of the plurality of removable electrical accessory modules, each receiving mounting space having a uniform electrical connector positioned to complete an electrical connection between a received accessory module and the electrical system coupler in the stationary interface housing when the module rack is mounted to the stationary interface housing.

2. The system of claim 1 wherein the uniform electrical connector of each mounting space comprises a plurality of compliant contact pads positioned to be in contact with a set of mating contact pads extending from the on-board circuitry when a module is received into the removable module rack.

3. The system of claim 1 wherein the uniform electrical connector comprises a strip conductor extending across each mounting space, the strip conductor positioned to be in contact with a set of mating contact pads extending from the on-board circuitry when a module is received into the removable module rack.

4. The system of claim 1 further comprising a display in communication with the electrical system coupler to display information generated by an accessory module received in the module rack.

5. The system of claim 4 wherein the display is mounted on the stationary interface housing.

6. The system of claim 5 wherein the display is mounted on a hinged access panel mounted to the stationary interface housing.

7. The system of claim 4 wherein the display is mounted on an accessory module received in the module rack.

8. The system of claim 1 wherein one of the plurality of removable accessory modules comprises a compass module.

9. The system of claim 1 wherein one of the plurality of removable accessory modules comprises a garage door opener module.

10. The system of claim 9 wherein the garage door opener module is arranged to operate when removed from the module rack.

11. The system of claim 1 wherein one of the plurality of removable accessory modules comprises a remote keyless entry module.

12. The system of claim 1 wherein one of the plurality of removable accessory modules comprises a tire pressure monitoring module.

13. The system of claim 1 wherein one of the plurality of removable accessory modules comprises a GPS module capable of operating when removed from the module rack.

14. A vehicle electronic accessory docking system comprising:
    a docking station having an interface housing mounted to the vehicle, said docking station including an electrical system coupler connected to a vehicle electrical system, and a plurality of uniformly dimensioned mounting spaces, each receiving mounting space having a uniformly positioned electrical connector; and
    at least one removeable accessory module having a uniform dimension independent of a designated function of the accessory module, said removable module arranged to be interchangeably mounted within any one of the mounting spaces in the docking station wherein the module has on-board circuitry arranged to allow the module to be operated when not mounted within a mounting space.

15. The system of claim 14 wherein the removable accessory module comprises a garage door opener module arranged to operate when removed from the docking station.

16. The system of claim 14 wherein the removable accessory module comprises a GPS module capable of operating when removed from the docking station.

* * * * *